United States Patent [19]

Kennedy, Jr.

[11] 4,138,025

[45] Feb. 6, 1979

[54] UNLOADING DEVICE

[76] Inventor: Alvin B. Kennedy, Jr., P.O. Box 282, Angleton, Tex. 77515

[21] Appl. No.: 886,795

[22] Filed: Mar. 15, 1978

Related U.S. Application Data

[63] Continuation of Ser. No. 743,763, Nov. 22, 1976, abandoned.

[51] Int. Cl.² .................. B65B 21/02; B65G 65/04
[52] U.S. Cl. .................................. 214/318; 214/1 QB; 214/313
[58] Field of Search ............... 214/301, 300, 313, 312, 214/314, 315, 318, 1 Q, 1 QD, 1 QB, 1 QE, 44, 46.24; 222/165

[56] References Cited

U.S. PATENT DOCUMENTS

| | | | |
|---|---|---|---|
| 1,021,649 | 3/1912 | Wodarra | 214/312 |
| 2,019,034 | 10/1935 | Alex | 222/165 |
| 2,578,116 | 12/1951 | White et al. | 214/314 |
| 3,253,725 | 5/1966 | Paton | 214/314 |

Primary Examiner—Lawrence J. Oresky

[57] ABSTRACT

The present invention relates to a new and improved unloading apparatus for dry particulate matter in containers wherein the containers are positioned in an enclosed drum and rotated. Thereafter, a releasable spout mounted with the drum enables the dry particulate matter to be dumped or released from the drum without danger to workmen or dangerous spreading of the dust from the dry matter.

8 Claims, 6 Drawing Figures

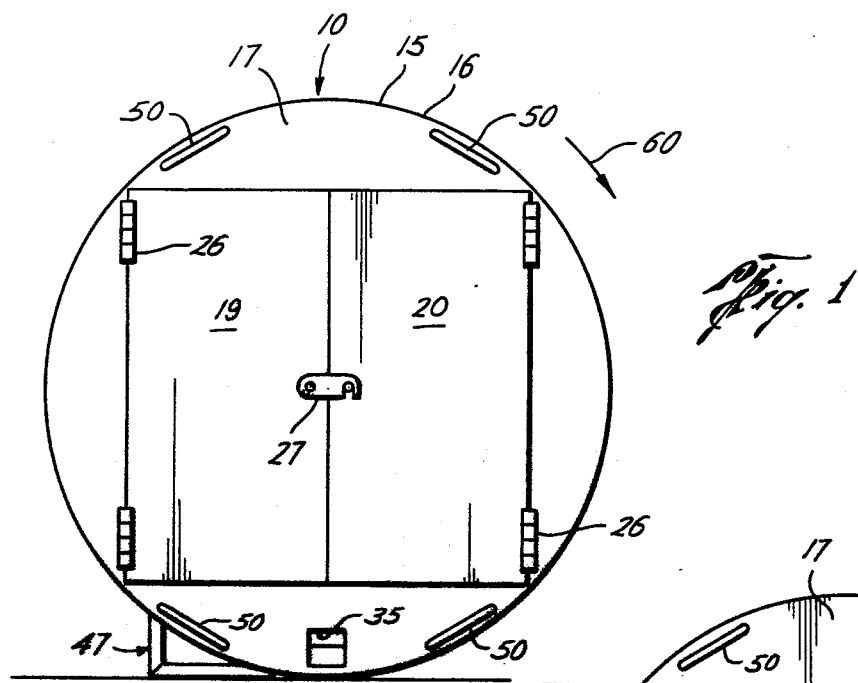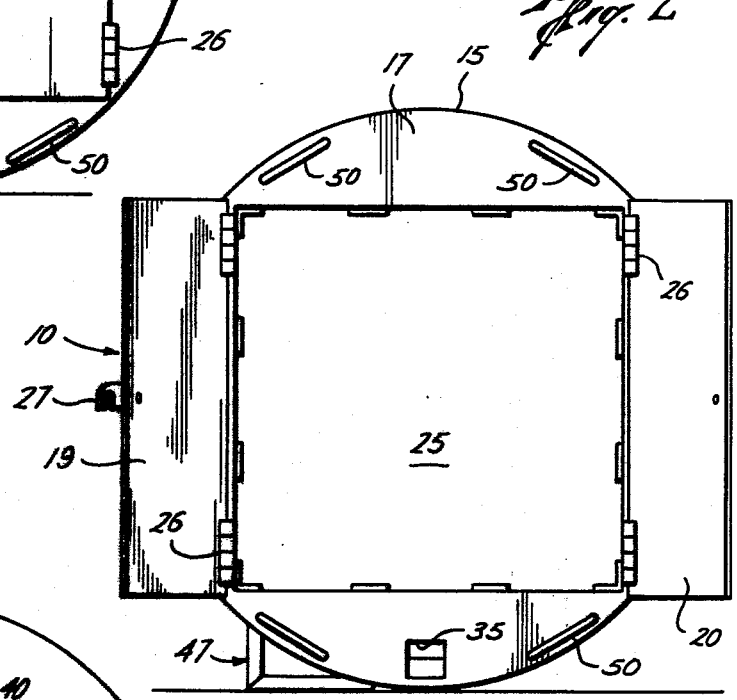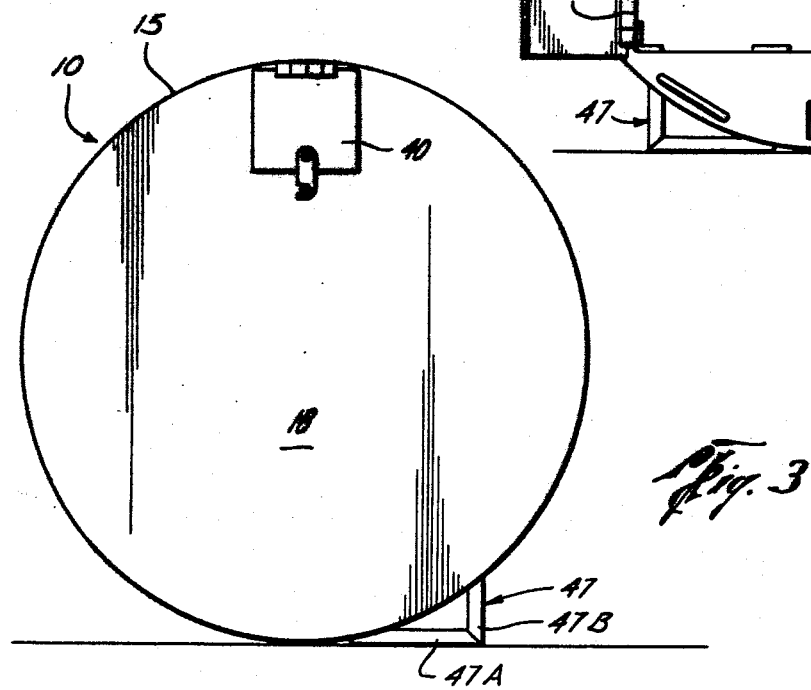

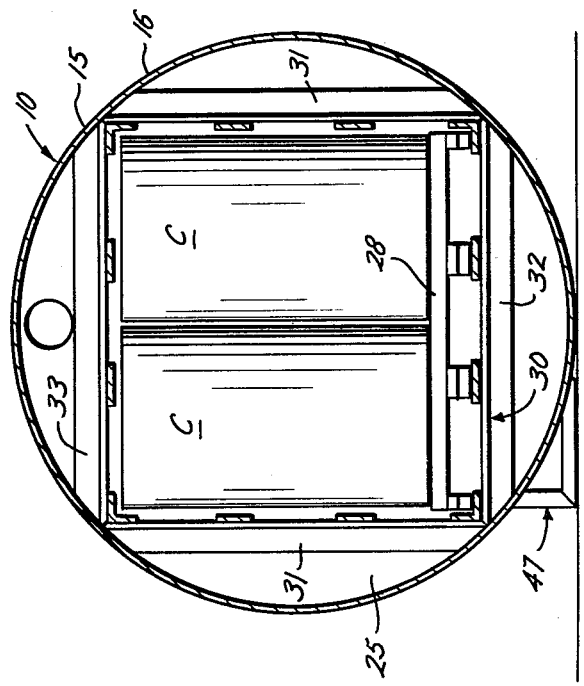
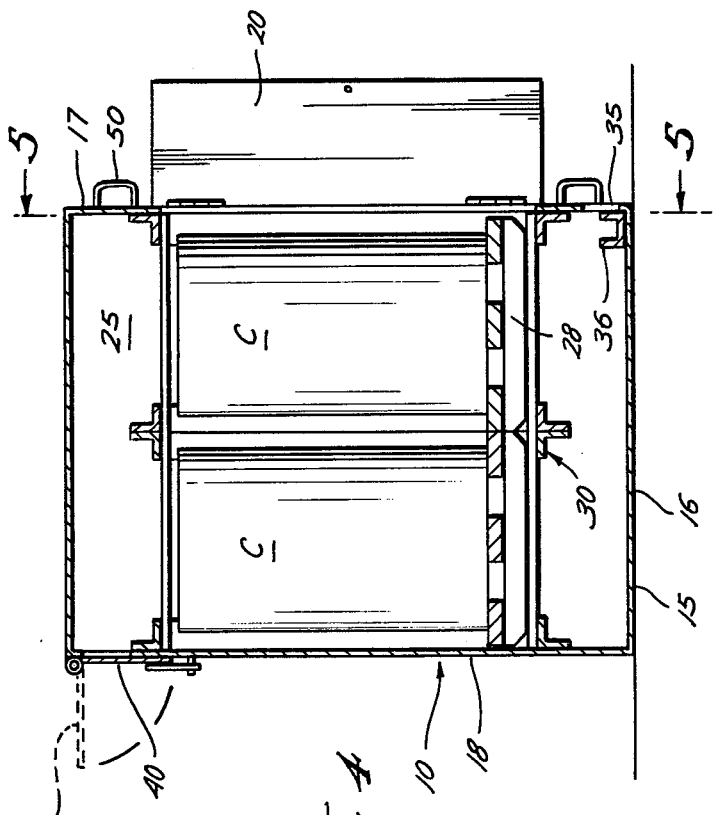
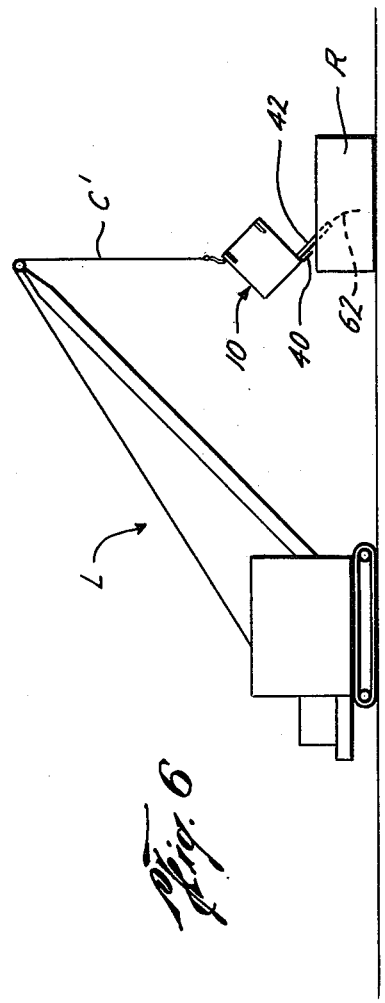

UNLOADING DEVICE

This is a continuation of application Ser. No. 743,763, filed Nov. 22, 1976 now abandoned.

BRIEF DESCRIPTION OF THE INVENTION, OBJECTS AND THE PRIOR ART

Briefly, the present invention relates to a new and improved apparatus for handling dry particulate matter placed in barrels and the like. The barrels are positioned on pallets and placed in a cylindrical drum having a rack enclosure positioned therein for receiving the barrels and pallets. After insertion of the barrels into the rack frame, the drum is thereafter rotated which causes the dry particulate matter to fall into the interior surface of the drum. The drum is then tilted and a dump spout is opened for releasing of the dry particulate matter in desired places.

In the prior art, it is common in processing plants to dump dry particulate matter positioned in large barrels with such barrels being open to the atmosphere. When dumping occurs, the dry matter dust causes damage to the skin and eyes of workmen, and causes severe pollution problems. Such handling of dry particulate matter is often times very dangerous and is further expensive and requires long periods of time for handling of the barrels of dry particulate matter.

It is an object of the present invention to provide a new and improved method and apparatus for handling dry particulate matter.

IN THE DRAWINGS

FIG. 1 is an end view illustrating the doors mounted at one end of a cylindrical enclosure or drum;

FIG. 2 is a view similar to FIG. 1 illustrating the doors being open and the rack frame mounted inside the cylindrical enclosure or drum;

FIG. 3 is an end view of a cylindrical enclosure or drum illustrating the door for a spout positioned therewith;

FIG. 4 is a longitudinal cross-sectional view of the interior of the cylindrical enclosure or drum;

FIG. 5 is a partial sectional front view of a cylindrical enclosure or drum of the present invention with the rack frame positioned therewith; and FIG. 6 is an overall prospective view of the cylindrical enclosure or drum being tilted to dump the dry particulate material therefrom.

IN THE SPECIFICATION

As illustrated in FIGS. 1, 2 and 3, the present invention is generally designated by the number 10 and includes a cylindrical enclosure or drum 15 having longitudinal circular walls 16 and enclosed ends 17 and 18 forming such enclosure 15.

The end 17 includes a pair of doors 19 and 20 which can be opened as illustrated in FIG. 2 for access to the interior 25 of the enclosure 15. As illustrated, each of the doors 19 and 20 includes hinges 26 and a door latch 27 for latching the doors 19 and 20 when they are closed together as illustrated in FIG. 1.

As further illustrated in FIG. 2, with the cylindrical enclosure generally illustrated at 10 in the upright position and positioned along its longitudinal axis, a floor 27 is provided for wood pallets 28 which may be conveniently placed in the opening 25 by suitable hydraulic or other type lifting devices as is well known in the art. As further illustrated in FIGS. 4 and 5, suitable containers or barrels C containing dry particulate matter and/or other dry material is positioned on the wood pallets and in the interior of the enclosure 25. The containers C and pallets 28 are maintaind in position by a rack frame generally illustrated as 30 which includes upright arms 31 and cross bars 32 and upper cross arms 33 to form a suitable frame or cage for the containers C which thus prevents such containers from rolling about inside the enclosure 25 upon rotation of the cylindrical enclosure illustrated at 10 about its cylindrical longitudinal axis.

As illustrated in FIGS. 1, 2 and 4, an opening illustrated at 35 is positioned below the doors 19 and 20 and in the end 17 to enable a hook or the like connected with a cable to be mounted with the U-frame 36 in a manner to be set forth hereinafter.

As further illustrated in FIGS. 3 and 4, a suitable spout lid 40 is mounted with such end 18 at its upper end thereof when such cylindrical member 10 is positioned to receive the pallets 28 and container C in the upright position. The spout means 40 is hingedly mounted and may be rotated to the position illustrated by the dotted lines 41 such that a spout means 42 formed of a suitable flexible tube (FIG. 6) may be unrolled for a manner and purpose to be set forth hereinafter.

As further illustrated in FIGS. 1-3, a suitable stop member 47 consists of cross bars 47A and 47B which are suitably welded adjacent the ends 17 and 18 to the exterior 16 of cylindrical member 10 and extend outwardly therefrom to be welded to each other to form such elbow or stop means 47.

As further illustrated in FIGS. 1 and 2, a pair of handles 50 suitably mounted with the end 17 above the doors 19 and 20 are provided for a purpose to be set forth hereinafter.

In the operation of the invention, a suitable pallet loading machine is used to pick up pallets 28 loaded with unlidded or open containers C which contain dry particulate chemicals, mixes, catalyst and the like to place such containers C and pallets 28 in the interior 25 of the cylindrical enclosure 15 with the pallets 28 being positioned on the floor 27. With the containers C in the enclosure 25, such containers are further encompassed and surrounded by the rack frame 30 including the upright vertical posts 31 and cross arms 32 and 33. The doors 19 and 20 are then closed which prevents communication of the interior 25 with the atmosphere.

Thereafter, the cylindrical enclosure 10 is rotated about its longitudinal axis by gripping the handles 50 and rotating the enclosure 10 in the direction of the arrow 60 approximately 180° which turns the barrels C upside down to thereby dump such mix into the interior 25 of the enclosure 15. In this position, the upper cross arms 33 of the rack frame 30 prevent the containers C from dropping into the mixture and maintains the containers C within the rack frame enclosure 30. In such position, the door 40 has been rotated from the position illustrated in FIG. 3 approximately 180° until it is at the bottom of the door 18 and the opening 35 and U-frame 36 have been rotated from the position illustrated in FIG. 1 until such U-frame 36 is at the top of the door 17.

Thereafter, a suitable lifting means such as illustrated by the crane or lifting means L, utilizes a suitable cable C' to tilt one end of the enclosure 10 upwardly. The cable C' is inserted through the opening 35 and connected to the U-frame 36 which enables the container 10 to be tilted upwardly. The door 40 is then opened to the position illustrated by the dotted lines and the arrow 41 to enable the particulate material to flow out of the interior 25 into a suitable receptacle R by unrolling the longitudinal, flexible tube member 42. The particulate matter illustrated by the dotted lines 62 thereafter falls into the receptacle R and out of the interior 25 of the enclosure 10. The foregoing description is illustrative only of the preferred embodiment of the present invention and such disclosure is not intended to limit the scope of the invention or claims.

I claim:

1. An apparatus for enabling dry particular matter in barrels to be safely unloaded in bulk quantities, including:
   (a) a cylindrical enclosure including a right circular cylinder and first and second end plates covering the respective first and second ends of the cylinder;
   (b) door means in the first end plate for providing access into said enclosure when said door means are in an opened position;
   (c) a rack frame mounted inside said enclosure adjacent the edges of said door means for receiving and supporting the barrels of dry particulate matter during dumping of same;
   (d) door closure means formed in a top portion of the second end plate, the top portion of the second end plate being the portion adjacent the open top of said barrels when supported by said frame, whereby when said cylindrical enclosure is rotated 180° about its cylindrical axis, the particulate matter is dumped out of said barrels and into said enclosure; and
   (e) connection means on said first end plate for enabling said cylindrical enclosure to be tilted in order to dispose said door closure means into a lower position which enables the particulate matter to be dumped through said door closure means.

2. The structure as set forth in claim 1 including a means for enabling said cylindrical enclosure to be tilted for dumping of the dry matter said means for enabling being mounted with said end having said door mounted therewith.

3. The structure as set forth in claim 1 wherein rolling said cylindrical structure back to its original position enables said door to be opened and the empty barrels removed.

4. The apparatus of claim 1 wherein the first and second end plates are disposed perpendicular to the axis of the cylinder.

5. An apparatus for enabling dry particulate matter in barrels to be safely unloaded in bulk quantities, including:
   (a) a cylindrical enclosure including first and second end plates covering the ends of the cylinder;
   (b) door means in the first end plate for providing access into said enclosure;
   (c) a rack frame mounted inside said enclosure adjacent said door means for receiving and supporting the barrels of dry particulate matter during dumping of same;
   (d) door closure means formed in a top portion of the second end plate, the top portion of the second end plate being the portion adjacent the open top of said barrels when supported by said frame, whereby when said cylindrical enclosure is rotated about its cylindrical axis, the particulate matter is dumped out of said barrels and into said enclosure; and
   (e) connection means on said first end plate for enabling said cylindrical enclosure to be tilted in order to position said door closure means into a lower position to thereby enable the particulate matter to be dumped through said door closure means.

6. The apparatus as set forth in claim 5, including a means for enabling said cylindrical enclosure to be tilted for dumping of the dry matter, said means for enabling being mounted with the first end plate.

7. The apparatus as set forth in claim 5, wherein rolling said cylindrical enclosure back to its original position enables said door to be opened and the empty barrels removed.

8. The apparatus as set forth in claim 5, wherein the first and second end plates are disposed perpendicular to the axis of the cylinder.

* * * * *